(12) United States Patent
Kao

(10) Patent No.: US 12,554,304 B2
(45) Date of Patent: Feb. 17, 2026

(54) JOBSITE AUDIO DEVICE WITH MULTI-SOURCE POWER AND MULTI-PORT USB INTERFACE

(71) Applicant: PHIHONG TECHNOLOGY CO., LTD., Taoyuan (TW)

(72) Inventor: Ming-Shen Kao, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 364 days.

(21) Appl. No.: 18/136,856

(22) Filed: Apr. 19, 2023

(65) Prior Publication Data

US 2024/0353906 A1 Oct. 24, 2024

(51) Int. Cl.
- *G06F 1/26* (2006.01)
- *G06F 13/42* (2006.01)
- *H02M 3/158* (2006.01)

(52) U.S. Cl.
CPC .......... *G06F 1/266* (2013.01); *G06F 13/4282* (2013.01); *H02M 3/1582* (2013.01); *G06F 2213/0042* (2013.01)

(58) Field of Classification Search
CPC .................. G06F 1/266; G06F 3/4282; G06F 2213/0042; H02M 3/1582
See application file for complete search history.

(56) References Cited

U.S. PATENT DOCUMENTS

| | | | | |
|---|---|---|---|---|
| 2014/0372783 A1* | 12/2014 | Wade | .................... | G06F 1/3206 713/340 |
| 2019/0195445 A1* | 6/2019 | Chien | ..................... | F21V 15/01 |
| 2022/0137688 A1* | 5/2022 | Wang | ........................ | G06F 1/26 713/300 |

* cited by examiner

*Primary Examiner* — Terrell S Johnson
(74) *Attorney, Agent, or Firm* — Chih Feng Yeh; Yongjean Consulting Inc.

(57) ABSTRACT

A jobsite audio device with multi-source power and multi-port USB interface is proposed, which includes an AC-DC power source, a battery pack, a multi-port USB interface including at least one bidirectional power delivery USB C port, a charging circuit coupled to the AC-DC power source, the battery pack and the multi-port USB interface to provide power delivery paths, an audio module powered by the AC-DC power source or the battery pack to generate audio signals, and a main controller coupled to the charging circuit and the audio module, wherein the main controller monitors power consumption of the audio module and charging process of the charging circuit to automatically adjust charging power.

18 Claims, 2 Drawing Sheets

JOBSITE AUDIO DEVICE WITH MULTI-SOURCE POWER AND MULTI-PORT USB INTERFACE

TECHNICAL FIELD

The present invention relates to technology field of jobsite audio device, and more particularly, a jobsite audio device with multi-source power and multi-port USB interface.

BACKGROUND

Jobsite or worksite audio device is typically any kind of conventional audio device can be brought to worksite or construction site where workers can listen to music, sports, talk shows and the like. Audio devices that output audio signals, such as radio, mp3, compact disc players, and the like, use a power supply to provide power for an audio circuit capable of outputting audio signals. Some audio devices connect to an AC power supply. Other audio devices use a battery pack to power an audio circuit. That means, there are two types of power sources available for jobsite audio devices, one is AC-DC power source, and the other is DC power source such as power tool battery pack, which is frequently available on jobsites.

If there is a battery pack charging function equipped with the jobsite audio device, a battery charger will be built in, which can only use one-way AC-DC charger to charge the battery pack. The battery pack can only supply power to the audio device, or deliver power to an external device through additional USB C or USB A ports in a unidirectional power delivery path.

After 2025, USB C charging/discharging devices will become the mainstream power supply of 3C equipments, jobsite audio devices should also be included, which can offer fast charging functionality.

The present invention intends to incorporate the jobsite audio device with the USB C charging/discharging device to offer more diversified and easily controlled power supply that built in the jobsite audio device. Therefore, the market opportunities of jobsite audio devices can be further expanded.

SUMMARY OF THE INVENTION

In view of the above problems, a jobsite audio device is provided in the present invention. According on aspect of this invention, a jobsite audio device with multi-source power and multi-port USB interface is proposed, which includes an AC-DC power source, a battery pack, a multi-port USB interface including at least one bidirectional power delivery USB C port, a charging circuit coupled to the AC-DC power source, the battery pack and the multi-port USB interface to provide power delivery paths, an audio module powered by the AC-DC power source or the battery pack to generate audio signals, and a main controller coupled to the charging circuit and the audio module, wherein the main controller monitors power consumption of the audio module and charging process of the charging circuit to automatically adjust charging power.

In one embodiment, the charging circuit includes a buck/boost converter electrical coupled to a power delivery dual role port controller (PD DRP controller), the buck/boost converter coupled to the main controller and the battery pack, and the PD DRP controller coupled to bidirectional power delivery USB C port of the multi-port USB interface.

In one preferred embodiment, the multi-port USB interface further includes a USB A port and the USB A port is powered by an USB A power unit.

In one preferred embodiment, in the case that the multi-port USB interface has no device coupled, the AC-DC power source provides DC power to power the audio module including the main controller and the PD DRP controller, and the buck/boost converter is activated by the main controller to charge the battery pack.

In one preferred embodiment, in the case that the bidirectional power delivery USB C port coupled an USB C AC adapter and the AC-DC power source is removed, the USB C AC adapter communicates with the PD DRP controller to activate the buck/boost converter to charge the battery pack by delivering power of the USB C AC adapter to the battery pack.

In one preferred embodiment, in the case that the bidirectional power delivery USB C port coupled an USB C AC adapter and the AC-DC power source is also coupled, the AC-DC power source provides DC power to power the audio module including the main controller and the PD DRP controller, and the buck/boost converter is activated by the main controller to block power from the DC power to enter into the bidirectional power delivery USB C port, power from the USB C AC adapter has priority to charge the battery pack.

In one preferred embodiment, in the case that the jobsite audio device only coupled with the battery pack, and the bidirectional power delivery USB C port coupled with an external device to request power, the battery provides DC power to power the audio module including the main controller and the PD DRP controller, the PD DRP controller communicates with the external device, activates the buck/boost converter and communicates with the main controller to control power of the battery pack charging the external device.

In one preferred embodiment, in the case that the AC-DC power source is used to charge an external device coupled to the bidirectional power delivery USB C port, the AC-DC power source provides DC power to power the audio module including the main controller and the PD DRP controller, the PD DRP controller communicates with the main controller and PD DRP controller communicates with the external device, the buck/boost converter is activated by PD DRP controller to convert the DC power of the AC-DC power source into suitable voltage and then delivered to charge the external device.

In one preferred embodiment, wherein the bidirectional power delivery USB C port further includes an abnormal overvoltage protection device disposed at downstream facing port of the bidirectional power delivery USB C port to detect abnormal potential.

In one preferred embodiment, wherein the bidirectional power delivery USB C port further includes a reverse potential difference potential module disposed at downstream facing port of the bidirectional power delivery USB C port to protect current from flowing reversely.

According on aspect of this invention, a jobsite audio device with multi-source power and multi-port USB interface is proposed, which includes an AC-DC power source, a battery pack, a multi-port USB interface, including one bidirectional power delivery USB C port, one unidirectional power delivery USB C port and one USB A port, a charging circuit coupled to the AC-DC power source, the battery pack and the multi-port USB interface to provide power delivery paths, an audio module powered by the AC-DC power source or the battery pack to generate audio signals, and, a main controller coupled to the charging circuit and the audio module, wherein the main controller monitors power consumption of the audio module and charging process of the charging circuit to automatically adjust charging power.

In one preferred embodiment, the charging circuit includes a buck/boost converter electrical coupled to a power delivery dual role port controller (PD DRP controller), the buck/boost converter coupled to the main controller and the battery pack, and the PD DRP controller coupled to bidirectional power delivery USB C port of the multi-port USB interface.

In one preferred embodiment, the unidirectional power delivery USB C port and one USB A port are integrated with a DCP and buck converter.

In one preferred embodiment, in the case that the multi-port USB interface has no device coupled, the AC-DC power source provides DC power to power the audio module including the main controller and the PD DRP controller, and the buck/boost converter is activated by the main controller to charge the battery pack.

In one preferred embodiment, in the case that the bidirectional power delivery USB C port coupled an USB C AC adapter and the AC-DC power source is removed, the USB C AC adapter communicates with the PD DRP controller to activate the buck/boost converter to charge the battery pack by delivering power of the USB C AC adapter to the battery pack.

In one preferred embodiment, in the case that the bidirectional power delivery USB C port coupled an USB C AC adapter and the AC-DC power source is also coupled, the AC-DC power source provides DC power to power the audio module including the main controller and the PD DRP controller, and the buck/boost converter is activated by the main controller to block power from the DC power to enter into the bidirectional power delivery USB C port, power from the USB C AC adapter has priority to charge the battery pack.

In one preferred embodiment, in the case that the jobsite audio device only coupled with the battery pack, and the bidirectional power delivery USB C port coupled with an external device to request power, the battery provides DC power to power the audio module including the main controller and the PD DRP controller, the PD DRP controller communicates with the external device, activates the buck/boost converter and communicates with the main controller to control power of the battery pack charging the external device.

In one preferred embodiment, in the case that the AC-DC power source is used to charge an external device coupled to the bidirectional power delivery USB C port, the AC-DC power source provides DC power to power the audio module including the main controller and the PD DRP controller, the PD DRP controller communicates with the main controller and PD DRP controller communicates with the external device, the buck/boost converter is activated by PD DRP controller to convert the DC power of the AC-DC power source into suitable voltage and then delivered to charge the external device.

In one preferred embodiment, the bidirectional power delivery USB C port further includes an abnormal overvoltage protection device disposed at downstream facing port of the bidirectional power delivery USB C port to detect abnormal potential.

In one preferred embodiment, the bidirectional power delivery USB C port further includes a reverse potential difference potential module disposed at downstream facing port of the bidirectional power delivery USB C port to protect current from flowing reversely.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Figure 1:
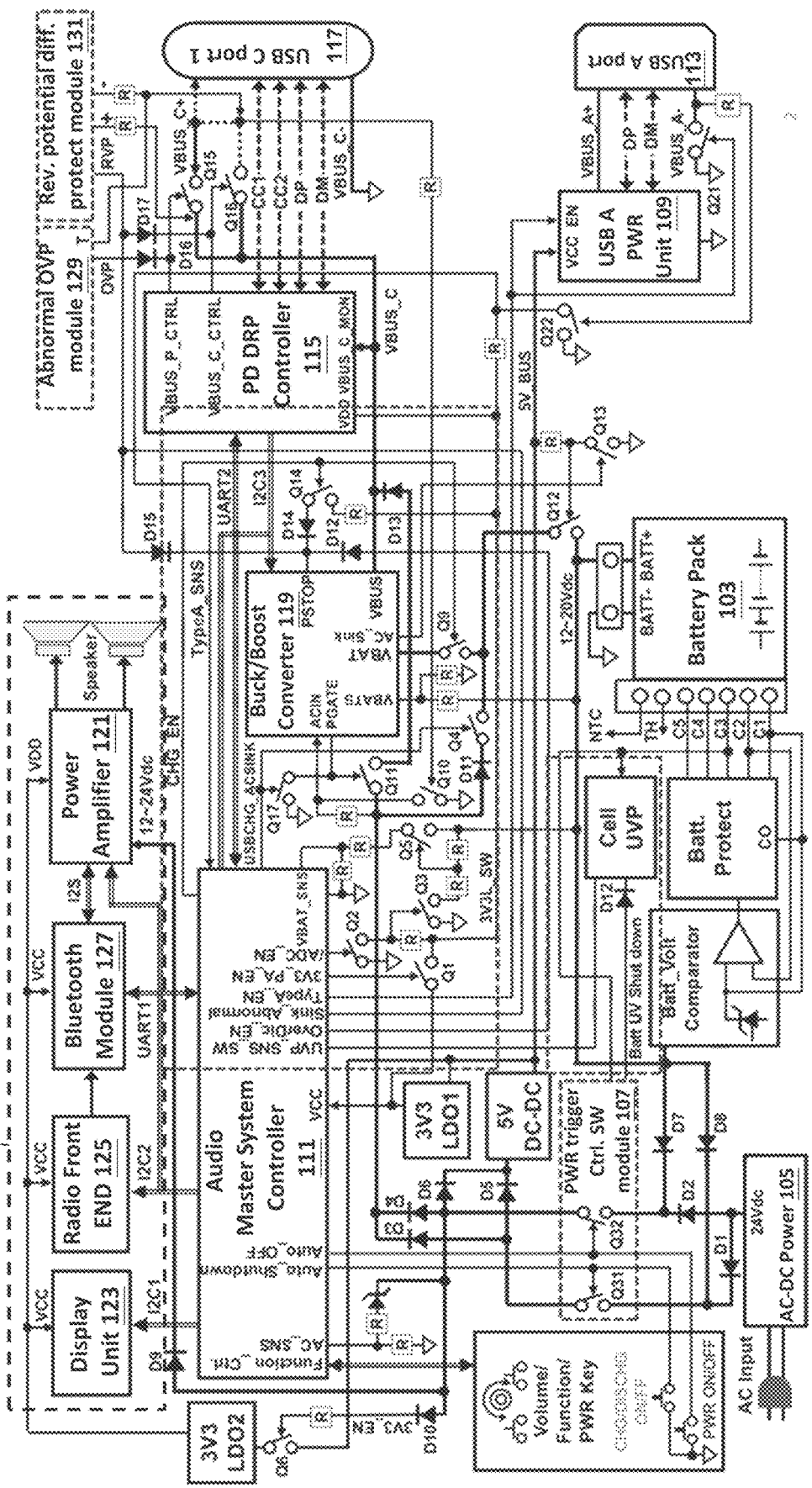
FIG. 1 shows a circuit block diagram of a jobsite audio device according to one embodiment of the present invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The purpose of the present invention is to propose novel jobsite audio device, which can be integrated with USB C PD fast charging functionality, enabling that the power supply of the jobsite audio device can be utilized as regular PD adapter for charging/discharging power to various 3C products, for example various electronic products, therefore maximizes its business opportunities.

The technical problems to be solved by the present invention include: (a) improving the issue that the AC-DC power of conventional jobsite audio devices can only offer unidirectional power charging path; (b) improving the issue that the USB C port of conventional jobsite audio devices can only offer discharging functionality from the internal battery pack to external device rather than provide charging functionality from external device to the internal battery pack; (c) improving the ability that conventional jobsite audio devices can only provide one type power delivery, such as from an AC-DC power source or an AC-DC adapter, or two types of power delivery, for example delivery power from an AC-DC power source or an AC-DC adapter to the internal battery pack, or delivery power from the DC internal battery pack; (d) preventing mistakenly plugging USB C PD 3.1 adapter into USB C PD 3.0/2.0 devices and cause device damage; (e) improving power consumption of jobsite audio devices in standby mode; (f) preventing reverse potential caused by charging the external coupled device via the USB C interface of the jobsite audio devices to damage the jobsite audio device.

Conventional audio devices usually include AC to DC power conversion equipment and a built-in battery pack charger circuit that can charge and discharge battery packs of external power tool, which is a well-known technology. The power provided by the built-in battery pack charger is a fixed power output design, which does not vary with the type of input power or the power consumption of the audio devices or the power provided by external devices. That means the power provided by the built-in battery pack doesn't automatically change the charging power of the battery pack or the power supplied to external devices.

In order to reach the goal that a proposed jobsite device can be integrated with USB C PD fast charging functionality and provide its power supply to be used as regular PD adapter for charging/discharging power to various 3C products, the present invention has proposed to make improvements as follows:

(1) in addition to multi-power input, the jobsite audio device will automatically switch the input source when charging the battery pack, and automatically reduce the charging power of the battery pack and the power of external equipment when the volume of the audio power amplifier is turned up;

(2) three kinds of input power, i.e., AC-DC, USB C adapter, and battery pack of power tool can coexist and can supply power or charge at the same time without conflict;

(3) multi-port USB C/USB A input or output terminals provide multiple voltage and power options;

(4) the amount of power that the jobsite audio device can be provided to charge a battery pack of power tool, depends on how much power an AC-DC or USB C adapter can provide, the power capacity of the battery pack of the power tool and the power output of the audio amplifier;

(5) the jobsite audio devices can provide PD 3.0/2.0 fast charging technology, which can charge or supply power to battery packs of external connected power tool and external coupled devices;

(6) this patent has applied USB C PD dual role port (DRP) two-way fast charging/discharging, jobsite audio device and battery packs of power tool charging and discharging technologies utilizing software/hardware control as power control method making the power supply of jobsite audio device as a multi-function/multi-source/multi-port power supply product, changing the single-function design of its original products;

(7) the power system of this jobsite audio device uses a pluggable rechargeable/dischargeable battery pack of power tool inserted into the special battery pack terminal as a DC power supply, where the battery pack can provide electricity to audio power amplifiers, radios, Bluetooth, AUX, etc., it can also provide power for external devices coupled to the USB port, and the power can be provided from the power system of the jobsite device depends on its design, such as the number and type of battery cells;

(8) the built-in AC-DC power supply of the jobsite audio device is a kind of AC-DC power supply, in addition to using a special buck/boost converter (bidirectional charger), it can quickly charge the battery pack of the power tool through the coupling of a dedicated battery terminal. At the same time, the power supply can also provide electricity to audio power amplifier, radio, Bluetooth, AUX, etc., as well as power to external devices coupled to the USB port. The available power depends on the design requirements;

(9) USB C PD adapter is one of options for the AC-DC power supply, it can utilize a PD controller and a special buck/boost converter (bidirectional charger) to perform fast charging on battery packs of power tool coupled to dedicated battery terminal. At the same time, the power supply can also provide electricity to audio power amplifier, radio, Bluetooth, AUX, etc., as well as power to external devices coupled to the USB port. The available power depends on the design requirements;

(10) the jobsite audio device has a built-in bidirectional USB C Port, which provides power to the plugged-in devices and can use 3 types of power sources: (i) AC-DC power supply (ii) PD 3.0/2.0 AC-DC adapter (iii) battery pack, it performs power delivery (PD) with PD 3.0 specification for external device through special buck/boost converter and PD controller;

(11) when the battery pack is plugged into the battery pack terminal of a special power tool, if the built-in AC-DC and USB C AC adapter of the jobsite audio device are inserted at the same time to fast charging the battery pack of the power tool and powering the jobsite audio device, in this situation, the charging of the battery pack is given priority assigned to AC adapter while the power supply of the audio device is given priority assigned to the built-in AC-DC power supply. In this state, when the volume of the audio amplifier is turned up, the system controller will automatically adjust and reduce the power distribution of other power supplies.

The jobsite audio device proposed in the present invention is not only an audio device and a charger battery packs, but also a USB C PD two-way power transfer device. The PD transfer device is designed to be a power supply system of audio device utilized the PD (power supply) specification of USB C 3.0 for multi-directional power transmission application. This proposed audio device uses its own audio master system controller (AMSC) and communications between the AMSC and PD controller to control a set of special buck/boost converter and multiple sets of switches to jointly establish the conversion and transmission of the multi-source/multi-voltage/multi-power charging/discharging power of the whole power system. The buck/boost converter is both a charger for the audio battery pack and a bi-directional transfer device for USB PD 3.0, capable of delivering up to 100 W of power in both directions. The built-in buck/boost converter of the audio device is bi-directionally controlled, and it has the properties of a charger. For example: when used as a USB C PD transfer device, it can accept power supply devices up to 100 W from a traditional type C interface. The use of the power transfer device as a tool, which can discharge the rechargeable/dischargeable battery pack and supply power to various external devices through the type C port for charging up to 100 W, and in addition it can output up to 5V, 0-3 A with maximum 15 power through its type A port.

This proposed built-in transfer device for jobsite audio device utilizes the power delivery (PD) or USB PD standard. The PD standard allows devices to draw up to 100 W through their type-C ports (bidirectional power flow) and in different voltage and current profiles, these products allow voltages of 5, 9, 12, 15 and 20V and currents up to 5 A. The PD standard uses PD contracts to establish the relationship between a PD device (in this case a power transfer device) and connected devices. This contract is an agreement between two PD devices connected via USB type-C cable. There are many subtle distinctions, but the most basic constraints on each device are that (1) the power supply (source) must establish and maintain an agreed-upon voltage within +/−4% while powering up to the agreed maximum current and (2) the receiver (sink) can source any amount of current from OA all the way up to the agree-upon maximum value. The current must not exceed the maximum value for more than a few milliseconds.

This proposed built-in USB C PD 3.0 dual role port (DRP) transfer device for jobsite audio devices is a PD contract for power supplies/power providers to agree to supply power to their partner devices. A PD customer/load/sink is a device in a PD contract that agrees to accept power from its partner device. A PD dual role port (DRP) device is one that can be a "source" or a "sink" depending on what is connected and its internal state. This built-in transfer device with PD controller circuit is a PD DRP device.

The proposed built-in transfer device (or PD charger) of this jobsite audio device can provide cordless delivery of USB C source streaming limited only by the available battery pack of power tool, with a choice of longer-run or shorter-run battery pack to customize the user experience, and the pack size, larger or smaller as needed, is ergonomic preferred.

As will be shown in the block diagram, the relative relationship of various power transmissions of this proposed jobsite audio device, the built-in AC-DC power supply of the audio device can charge the battery pack or supply power to external devices, or the USB C AC adapter can charge the battery pack, or the battery pack supplies power to external devices through the same set of buck/boost converters to convert and transmit its power in two-way communication.

In one aspect of the present invention, according to the block diagram will be shown in FIG. 1, the relationship between the built-in transfer device (or charger/discharger converter) and the external rechargeable/dischargeable battery pack of the jobsite audio device, where the coupling between them is connected with a built-in battery pack terminal block as the interface of power transmission.

This proposed jobsite audio device contains an USB C port, which can provide two-way power delivery:
A. an USB C AC adapter can be provided to charge the battery pack up to 100 Wh;
B. when the battery pack of the audio device supplies power to the external devices through of the USB C Port, the maximum power supply can reach up to 100 Wh depending on the capacity of the battery pack;
C. when the AC-DC power supply is plugged in but (i) the battery pack of the power tool pack is not asserted or the battery pack is not charged, (ii) the USB A port is not powered, and (iii) the audio device is not powered, use the USB C port to provide power to external devices up to 100 W, how much power can be provided depends on the design of the built-in AC-DC power supply and output power design of the audio power amplifier of the audio device;
D. USB port A can provide a maximum power output of 12 W 5V/2.4 A;
E. when the AC-DC power supply is transferring power, both (i) the USB C port and (ii) the USB A port supply power to external devices at the same time, the maximum output power of USB A remains unchanged, but the output watts of the USB C depends on the power of the built-in design and can moderately reduce the power to be supplied;
F. when there is no AC-DC power supply, only the battery pack is inserted, how much power it can provide depends on the capacity of the battery pack and the summation of audio amplifier, the USB A and the USB C and cannot exceed 100 W.

FIG. 1 shows a circuit block diagram of a jobsite audio device 101 according to one embodiment of the present invention. The following descriptions uses the block diagram shown in FIG. 1 to describe the operating states of various charging and power supply circuits.

I. When the jobsite audio device 101 is inserted with the battery pack 103 of power tool and is plugged in the AC-DC power supply 105 to charge the battery pack 103 or the battery pack is in fully charge the state.

In case I(a), power (PWR) switch is in OFF and CHG/DISCHG switch in ON state. Short pressing the CHG/DISCHG ON/OFF key to trigger the power trigger control switching module (PWR Trigger Ctrl. SW module) 107, switch Q31 is ON to form a closed circuit, because the 24 Vdc of diode D1 is higher than the 12~20 Vdc potential of diode D8, so 24 Vdc power enters switch Q31 of the power trigger control switching module 107 that is first triggered to be a closed circuit, the 24 Vdc current flows into the closed-circuit Q31 through the positive pole of diode D1 and then divides into two routes. The first route enters through diode D5 to start the 5V DC-DC converter to step down and supply 5V_BUS power to the USB A power unit (USB A PWR Unit) 109 and supply 3V3 LDO1 (low-dropout regular) to reduce/stabilize the voltage and then supply to the main audio system. The audio master system controller (hereinafter referred to as "main controller") 111 controls 3V3_PA_EN/ADC_EN to make switches Q1, Q2, Q3, Q5, and Q12 closed-circuit. When a device is inserted into the USB A Port 113, switch Q22 will be closed-circuit grounded and then the TypeA_SNS pin will notify the main controller 111 to enable TypeA_EN and then make switch Q21 closed and at the same time enable the USB A power unit 109 to output 5V to VBUS_A and USB A port 113. After switch Q1 is closed, 3V3L_SW starts to supply power to VDD pin of the PD DRP controller 115. When the USB C Port 1 (first USB C port) 117 has no power, switch Q10 is opened and not grounded, so the ACIN Pin of the buck/boost converter 119 is pulled high. At this time, the PD DRP controller 115 utilizes I2C3 to communicate with the buck/boost converter 119 and to control the PGATE pin making switch Q11 closed, the AC_Sink pin float, switch Q13 opened and switch Q12 closed. The second route of 24 Vdc power therefore flows from diode D3 to switch Q11 and then flows into diode D13 to supply power to the PD DRP controller 115, the VBUS of the buck/boost converter 119, the VBUS_C_MON pin and the CHG_EN pin of the main controller 111 to close switches Q14 and Q9 causing the PSTOP pin to pull high to activate the buck/boost converter 119. At this time, the VBAT_SNS pin of the main controller 111 starts to detect the potential of the battery pack 103 and determine the number of cells, and the AC_SNS pin is used to distinguish whether the power supply is a high-potential 24 Vdc or a low-potential power supply of battery pack 103. The main controller 111 starts to communicate with the PD DRP controller 115 through UART2, because the charging priority is controlled by the main controller 111 when the USB C port 1 (first USB C port) 117 is not plugged in with external device, and the PD DRP controller 115 starts to keep switches Q15 and Q16 opened through the VBUS_P_CTRL and VBUS_C_CTRL 2 pins, the buck/boost converter 119 detects the voltage of the battery's cell components through the VBATS pin, and the 24 Vdc power starts to charge the battery pack 103 by converting the required voltage/current that is transmitted through the VBAT pin of the buck/boost converter 119. After the required voltage/current is transmitted through the VBAT pin, which is coupled to the battery pack 103 through switches Q9 and Q12, and the battery pack terminals, the voltage/current is used to charge the battery pack 103. The main controller 111 controls the startup of the buck/boost converter 119 through I2C3 to start various charging procedures. The main controller 111 also provides battery potential to the VBAT_SNS Pin for detection through Q5 closed circuit. If the total potential of the battery pack 103 falls below the set reference potential, the main controller 111 will request the buck/boost converter 119 to charge the battery pack 103 through I2C3. Conversely, if the total potential of the battery pack 103 is greater than the set high level, to avoid overcharging, the system will stop charging immediately. When there is a device plugged into the USB A port 113, switch Q22 is grounded to notify the main controller 111 through the TypeA_SNS pin, and then the TypeA_EN pin of the main controller 111 controls the EN pin of the USB A power unit 109, allowing 5V_BUS power to enter the USB A power unit 109 to provide power outputted from the 5V DC-DC converter to the coupled device, which can provide 5V, 0-2.4 A current. Other charging modes of battery pack 103 and charging protection OVP/OTP/UVP technologies are well known and will not be detailed here.

As the above conditions, total power needed including charging power of the battery pack 103 for five serial-connected cells with 20V and current limit 3 A (equal to 60 W) plus the charging power of USB A (maximum 15 W) is 75 W, which is less than the AC-DC 24 Vdc power supply (assumed to be 100 W), if USB A is not powered, the battery pack can charge up to 100 W.

As mentioned above, if the battery pack 103 is fully charged and the charging is stopped, for example, after 5 minutes, and the UART2, I2C3, TypeA_SNS and other operation pins of the main controller 111 detect no feedback signals, no usage or operation status. The main controller 111 will be automatically pulled low by the Auto_Shutdown Pin, so that switch Q31 of the power trigger control switching module (PWR Trigger Ctrl. SW module) 107 is opened (OFF) to turn off both 24 Vdc and VBATT power supplies.

In case I(b), PWR switch is in ON and CHG/DISCHG switch in OFF state. Short pressing the PWR ON/OFF key to trigger the power trigger control switching module 107, switch Q32 is ON to form a closed circuit, because the 24 Vdc of diode D2 is higher than the 12~20 Vdc potential of diode D7, so 24 Vdc power enters switch Q32 of the power trigger control switching module 107 that is first triggered to be a closed circuit, the 24 Vdc current flows into the closed-circuit Q32 through the positive pole of diode D2 and then divides into four routes. The first route enters through diode D4 to power the battery pack 103, the second route enters through diode D6 to start the 5V DC-DC converter to step down and supply 5V_BUS power to the USB A power unit 109 and supply 3V3 LDO1 (first low-dropout regulator) to reduce/stabilize the voltage and then supply to the main audio system. The operations of the main controller 111 are the same as described in case I(a) and not repeated here. The third route enters through diode D9 to power amplifier 121, and the fourth route enters through diode D10 to make switch Q6 in closed state (ON) and then through 5V_BUS to 3V3 LDO2 (second low-dropout regulator) to reduce power to 3.3V for supplying power to display unit 123, radio front end 125, Bluetooth module 127 and power amplifier 121. After that, if the volume is turned up to the predetermined power stage or the maximum power when playing music, the main controller 111 will immediately control the buck/boost converter 119 through I2C3 to reduce the charging power by half or less. The power reduction with respect to 24 Vdc can be varied with appropriate design changes.

According to embodiments of the present invention, the aforementioned display unit 123, radio front end 125, Bluetooth module 127 and power amplifier 121 together with the speaker coupled to the power amplifier 121 can be realized as an audio module 141, which can be powered by the AC-DC power source 105 or the battery pack 103 and controlled by the main controller 111.

As the above conditions, total power needed including power amplifier (20 W), needed charging power of the battery pack 103 for five serial-connected cells with 20V and current limit 3 A (equal to 60 W) plus the charging power of USB A (maximum 15 W) is about 95 W, which is less than the AC-DC 24 Vdc power supply (assumed=100 W), if USB A is not powered, the battery pack can charge up to 100 W.

As mentioned above, if the battery pack 103 is fully charged, the USB A port 113 is not powered in the radio mode, there is no music playing in the Bluetooth mode, there is no signal input from the AUX terminal, and the USB C port 117 is not used (except for no signal in the radio mode), then after normal power supply mode but no function or no operation for a period of time, the main controller 111 will start timing, for example, after 10 minutes, the Auto_OFF pin of the main controller 111 will automatically pull low to trigger the power trigger control switching module 107 making switch Q32 opened to turn off the total power of the audio system, therefore reducing power consumption of 24 Vdc and battery pack 103.

II. When the jobsite audio device 101 is inserted with the battery pack 103 of power tool and only AC adapter is plugged in the USB C port 1 117 to charge the battery pack 103 or the battery pack is in fully charge the state.

According to some embodiments of the present invention, the USB C port 1 117 is a bi-directional power delivery USB C port.

In case II(a), PWR switch is in OFF and CHG/DISCHG switch in ON state. AC-DC plug for 24 Vdc is unplugged. Short pressing the CHG/DISCHG ON/OFF key to trigger the power trigger control switching module 107, switch Q31 is ON to form a closed circuit. The 12~20 Vdc power of the battery pack 103 enters switch Q31 through diode D8, then into diode D5 to start the 5V DC-DC converter to step down and supply 5V_BUS power to the USB A power unit 109 and supply 3V3 LDO1 to reduce/stabilize the voltage and then supply to the main audio system. The operations of the main controller 111 are the same as described in case I(a) and not repeated here. The USB C AC power adapter communicates with the PD DRP controller 115 through the CC1/CC2/DP/DM pins. If the two parties agree to communicate, the PD DRP controller 115 activates the VBUS_P_CTRL pin making switch Q15 closed, the VBUS_C_CTRL pin making switch Q16 opened, the CHG_EN pin making switches Q14 and Q9 closed to enable PSTOP pin pulling high to activate the buck/boost converter 119, utilizing UART2 to communicate with the main controller 111 and I2C3 to control the buck/boost converter 119 letting the AC_Sink pin floating to make switch Q13 opened and switch Q12 closed, when VBUS_C has power and enters the gate of switch Q10 making Q10 ground and forcing the ACIN pin pulled low to let PGATE pin to open switch Q11 for preventing the current of the battery pack 103 from flowing reversely through diode D3 to VBUS_C line. Power of the USB C adapter passes through VBUS_C pin and then flows from switch Q15 to the VBUS_C_MON pin of the PD DRP controller 115 and the VBUS pin of the buck/boost converter 119. The charging current starts to flow through switches Q9 and Q12 and couples into the battery pack 103 through the battery terminal for charging. At the same time, the distribution of the charging power of the battery pack 103 needs to be appropriately designed according to the power that the USB C AC adapter and the battery pack can provide. For example, total power needed including needed charging power of the battery pack 103 for five serial-connected cells with 20V and current limit 5 A is equal to 100 W, which is less than or equal to the power of the USB C adapter (assumed to be 100 W). In this charging state, the power supply of USB A is provided by the battery pack 103, the battery pack can charge up to 100 W.

As mentioned above, if the battery pack 103 is fully charged, the UART2, I2C3, TypeA_SNS and other operation pins of the main controller 111 detects no feedback signal for 5 minutes, and the main controller 111 will automatically pull low from the Auto_Shutdown pin to enable the power trigger control switching module making switch Q31 opened (OFF) to turn off the 12~20V battery power supply to reduce standby power consumption.

In case II(b), PWR switch is in ON and CHG/DISCHG switch in OFF state. AC-DC plug for 24 Vdc is unplugged. Short pressing the PWR ON/OFF key to trigger the power trigger control switching module 107 making switch Q32 closed, the 12~20 Vdc power of the battery pack 103 enters to switch Q32 through diode D7 then branches into three power routes. First power route flows into diode D6, then into diode D5 to start the 5V DC-DC converter to step down and supply 5V_BUS power to the USB A power unit 109 and supply 3V3 LDO1 to reduce/stabilize the voltage and then supply to the main audio system. The operations of the main controller 111 are the same as described in case I(a) and not repeated here. The USB C AC power adapter communicates with the PD DRP controller 115 through the CC1/CC2/DP/DM pins. If the two parties agree to communicate, the PD DRP controller 115 activates the VBUS_P_CTRL pin making switch Q15 closed, the VBUS_C_CTRL pin making switch Q16 opened, the CHG_EN pin making switches Q14 and Q9 closed to enable PSTOP pin pulling high to activate the buck/boost converter 119, utilizing UART2 to communicate with the main controller 111 and I2C3 to control the buck/boost converter 119 letting the AC_Sink pin floating to make switch Q13 opened and switch Q12 closed. Second power route flows into the power amplifier 121 through diode D9. Third power route flows into diode D10 and activates 5V_BUS by making switch Q6 closed to enable the 3V3 LDO2 to supply 3.3V power to display unit 123, radio front end 125, Bluetooth module 127 and the power amplifier 121. USB C power enters to the gate of switch Q10 making Q10 ground and forcing the ACIN pin pulled low to let PGATE pin to open switch Q11 for preventing the current of the battery pack 103 from flowing reversely through diode D4 to VBUS_C line. Power of the USB C adapter from VBUS_C starts to flow into the VBUS_C MON pin of the PD DRP controller 115 and VBUS pin of the buck/boost converter 119 via switch Q15 and then charges the battery pack 103 through switches Q9 and Q12 coupled into the battery pack 103. At the same time, the distribution of the charging power of the battery pack 103 needs to be appropriately designed according to the amount of power that the USB C AC adapter and the battery pack 103 can provide. For example, total power needed including needed charging power of the battery pack 103 for five serial-connected cells with 20V and current limit 5 A is equal to 100 W, which is less than or equal to the power of the USB C AC adapter (assumed to be 100 W). In this charging state, the power supply of USB A is provided by the battery pack, the battery pack can charge up to 100 W.

As mentioned above, if the battery pack is fully charged, the UART2, I2C3, TypeA_SNS and other operation pins of the main controller 111 detects no feedback signal for 10 minutes, and the main controller 111 will automatically pull low from the Auto_Shutdown pin to enable the power trigger control switching module making switch Q32 opened (OFF) to turn off the 12~20V battery power supply to reduce standby power consumption.

III. When the jobsite audio device 101 is inserted with the battery pack 103 of power tool and has the AC-DC power supply 105 been plugged and the AC adapter is plugged in the USB C port 1 (first USB C port) 117 to charge the battery pack 103 or the battery pack is in fully charge the state.

In case III(a), PWR switch is in OFF state and CHG/DISCHG switch in ON state. Short pressing CHG/DISCHG ON/OFF key to trigger the power trigger control switching module making switch Q31 closed circuit (ON), 24 Vdc power flows into diode D5 and the operations of the main controller 111 are the same as described in case I(a) and not repeated here. The main controller 111 enables switch Q1 closed to provide power to the PD DRP controller 115 via the 3V3L_SW. The USB C AC power adapter communicates with the PD DRP controller 115 through the CC1/CC2/DP/DM pins. If the two parties agree to communicate, the PD DRP controller 115 activates the VBUS_P_CTRL pin making switch Q15 closed, the VBUS_C_CTRL pin making switch Q16 opened, and communicates with the main controller 111 through UART2. The main controller 111 uses the USBCHG/ACSINK pin to close switch Q17 and to make switches Q11 and Q4 opened. The CHG_EN pin of the main controller 111 makes switch Q14 closed to activate the buck/boost converter 119, and then switch Q9 is closed. The buck/boost converter 119 utilizes the AC_SINK pin float to make switch Q13 opened and switch Q12 is closed. Because switch Q11 is opened, diode D3 has no current, switch Q15 is closed, VBUS_C enters gate of switch Q10 to forced Q10 ground, and ACIN pin of the buck/boost converter 119 is forced to ground, enabling that PGATE pin of the buck/boost converter 119 make switch Q11 opened to block current of 24 Vdc from flowing into VBUS_C of the PD DRP controller 115. Whether the AC-DC power is input power or not, as long as there is an AC adapter inserted into the USB C port 117 to charge the battery pack 103, the AC adapter must have the priority to charge the battery pack 103. Current of the AC adapter from the VBUS_C starts to flow into the VBUS_C_MON pin of the PD DRP controller 115 and the buck/boost converter 119 through switch Q15 connected to the VBUS pin and then the charging current flows through switches Q9 and Q12 coupled into the battery pack 103 through the battery terminal for charging. At the same time, the distribution of the charging power of the battery pack 103 needs to be appropriately designed according to the power that the adapter and the battery pack can provide. For example, total power needed including needed charging power of the battery pack for five serial-connected cells with 20V and current limit 5 A is equal to 100 W, which is less than or equal to the power of the USB C adapter (assumed to be 100 W). In this charging state, the power supply of USB A and 5V system can be neglected. In this situation, the battery pack can charge up to 100 W.

As mentioned above, if the battery pack 103 is fully charged, the UART2, I2C3, TypeA_SNS and other operation pins of the main controller 111 detects no feedback signal for 5 minutes, and the main controller 111 will automatically pull low from the Auto_Shutdown pin to enable the power trigger control switching module 107 making switch Q31 opened (OFF) to turn off the 24 Vdc/12~20V battery power supply to reduce standby power consumption.

In case III(b), PWR switch is in ON state and CHG/DISCHG switch in OFF state. Short pressing CHG/DISCHG ON/OFF key to trigger the power trigger control switching module 107 making switch Q32 closed circuit (ON), 24 Vdc power flows into diode D2 and then pass through switch Q32, the power of 24 Vdc branches into four routes. The first route enters to switch Q11 through diode D4 and this charging path is blocked because the USB C adapter is inserted. The second route enters to 5V DC-DC converter through diode D6 to step down and supply 5V_BUS power to the USB A power unit 109 and supply 3V3 LDO1 to reduce/stabilize the voltage and then supply to the main audio system, and the operations of the main controller 111 are the same as described in case I(a) and not repeated here. The third route enters to the power amplifier 121 through diode D9, and the fourth route enters D10 making switch Q6 closed and then enters 3V3 LDO2 from 5V_BUS to supply power to the display unit 123, the radio pre-stage 125, Bluetooth module 127, and power amplifier 121 of the 3.3V digital system. The current of the USB C AC adapter from VBUS_C enters switch Q15 and then flows to the VBUS_C_MON pin the PD DRP controller 115 and the VBUS pin of the buck/boost converter 119. At the same time, switch Q10 is closed to force Q11 to be opened, Q9 to be closed, and Q12 to be closed. Power of the USB C AC adapter from VBUS_C changes the voltage from the buck/boost converter 119, after that, the current is output from the VBAT pin of the buck/boost converter 119 and coupled to the battery terminal to start charging the battery pack 103. After that, if the volume is turned up to the predetermined power stage or the maximum power when playing music, the 24 Vdc power supply does not need to share the rest of the power to charge the battery pack 103 because there is a USB C AC adapter plugged in the USB C port 1 117. There is a priority for charging the battery pack 103. Under this situation, the main controller 111 will not control the buck/boost converter 119 through I2C3 and the control of the buck/booster 119 is handed over to the PD DRP controller 115 to proceed the battery charging. For example, total power needed to charge the battery pack 103 for five serial-connected cells with 20V and current limit 5 A (equal to 100 W), which is less than or equal to power of the USB C AC adapter can supply (assumed to be 100 W).

While the 24 Vdc power only needs to be supplied to the power amplifier 121, system power (negligible) and USB A, the total power consumption of power amplifier (assumed to be 20 W) plus USB A (15 W) is 35 W, which is way more less than the power of 24 Vdc power supply can supply (100 W).

As mentioned above, if the battery pack 103 is fully charged, the USB A is not powered in the radio mode, no music is played in the Bluetooth mode, there is no signal input from the AUX terminal, and the USB C Port is not used. After a period of time, the main controller 111 of the radio system will start timing. for example, after 10 minutes, the Auto_OFF pin of the main controller 111 will automatically pull low to trigger the power trigger control switching module 107 making switch Q32 opened to turn off the total power of the audio system to reduce the standby power loss of the 24 Vdc power, the USB C AC adapter and the battery pack 103.

IV. When the jobsite audio device 101 is inserted with the battery pack 103 of power tool, both the AC-DC power supply 105 and the AC adapter have not been plugged, and an USB C device is plugged in the USB C port 1 117 to ask for charging by the battery pack.

In case IV(a), PWR switch is in OFF state and CHG/DISCHG switch in ON state. Short pressing CHG/DISCHG ON/OFF key to trigger the power trigger control switching module 107 making switch Q31 closed circuit (ON), power of the battery pack (12~20 Vdc) flows into switch Q31 through diode D8 and branches into two routes to supply power. The first route enters through diode D5 to start the 5V DC-DC converter to step down and supply 5V_BUS power to the USB A power unit 109 and supply 3V3 LDO1 to reduce/stabilize the voltage and then supply to the main audio system. The main controller 111 controls 3V3_PA_EN/ADC_EN to make switches Q1, Q2, Q3, Q5, and Q12 closed-circuit and makes the 3V3 LDO powering the PD DRP controller 115. When a device is inserted into the USB C port 117 to ask for charging, the PD DRP controller 115 communicates with the external coupled device through CC1/CC2/DP/DM pins of the USB C port 117. If the two parties agree to communicate, the PD DRP controller 115 activates the VBUS_P_CTRL pin making switch Q15 closed, the VBUS_C_CTRL pin making switch Q16 opened, the CHG_EN pin making switches Q14 and Q9 closed to enable PSTOP pin pulling high to activate the buck/boost converter 119, utilizing UART2 to communicate with the main controller 111 and I2C3 to control the buck/boost converter 119 letting the AC_Sink pin to make switch Q12 closed. The main controller 111 utilizes USBCHG/ACSINK pin making switch Q17 closed to force switch Q11 opened, Q4 closed. The second route of the power of the battery pack (12~20 Vdc) passes diode D3 and flows into diode D11, switches Q4 and Q9, then flows into the VBAT pin of the buck/booster converter 119. At the same time, the buck/booster converter 119 utilizes the AC_Sink pin to make switch Q13 closed to ground to make switch Q12 opened circuit for preventing the current of the battery pack 103 from flowing reversely through switch Q12 to switch Q4. The buck/boost converter 119 converts the power of the battery pack 103 fed via VBAT pin into voltage, and then outputs the voltage from VBUS pin to VBUS_C_MON pin of the PD DRP controller 115 to monitor the potential. After that, the PD DRP controller 115 monitors the charging status of the buck/boost converter 119 through I2C3, and then the output voltage from the VBUS pin passes switch Q16 and VBUS_C+ to charge the external device coupled to the USB C port 117. When an external device is plugged into the USB A port 1113 and requires to supply power, the USB A power unit 109 uses DP/DM pins to communicate with the external device, and after confirming the agreement, it starts to supply power to the external device. If the external device coupled to the USB A port 113 is fully charged, unplug it (no other power consumption state). For example, after 5 minutes, the Auto_Shutdown pin of the main controller 111 will be automatically pulled low to trigger power trigger control switching module 107 to open switch Q31 and cut off the power supply from the battery pack 103, so that the automatic triggered switch can completely cut off the current of the battery pack 103 to prevent standby power loss. Similarly, when the external device coupled to the USB C Port 1 117 is fully charged and the buck/boost converter 119 of the system is turned off, in the state, for example, if the external device has not been unplugged after 1 minute, the PD DRP controller 115 will send a sleep signal from UART2 to notify the main controller 111. If there is no other power consumption mode, the Auto_Shutdown pin of the main controller 111 will automatically be pulled low after 5 minutes, so that the power trigger control switching module 107 makes switch Q31 opened (OFF) and the power supply of the battery pack 103 will be cut off. If the battery pack 103 uses USB C Port 1 117 alone to supply power to external device, it can provide a maximum power of 100 W depending on the capacity of the battery pack. If the USB A port 113 is used together, the USB C Port 1 117 can only provide a maximum power of 60 W. The total power supply needs to be reduced and is depended on the design. If voltage of the battery pack 103 is under a threshold voltage detected by the Cell UVP module during the discharge process or after a period of time, the Cell UVP module will connect the power trigger control switching module 107 to pull low through diode D12 to turn off the switches Q31 and Q32 together for protecting the battery pack 103 from over-discharge. To restart the charging, just plug in the AC power and press the CHG/DISCHG ON/OFF key for a short time.

In case IV(b), PWR switch is in ON state and CHG/DISCHG switch in OFF state. Short pressing CHG/DISCHG ON/OFF key to trigger the Power trigger control switching module making switch Q32 closed circuit (ON), power of the battery pack (12~20 Vdc) flows into switch Q32 through diode D7 and branches into four power supply routes to supply power. The first route enters diode D5 to activate the 5V DC-DC converter to step down and supply power to supply 5V_BUS power to the USB A power unit 109 and to supply 3V3 LDO1 to drop/stabilize the voltage and then supply power to the main controller 111. The second route enters to diode D11, switches Q4 and Q9 to the VBAT pin of the buck/booster converter 119 through diode D4. The aforementioned two routes are in the same operation mode as described in case IV(a), the third route is supplied to the power amplifier 121 through diode D9, and the fourth route is passed through diode D10 to enable switch Q6 closed circuit and then 5V_BUS enters the 3V3 LDO2 to drop voltage to 3.3V for supplying power to digital system, such as display unit 123, radio front end 125, Bluetooth module 127, and power amplifier 121. After that, if the volume is turned up to the set power or maximum when playing music, the main controller 111 will immediately control the buck/boost converter 119 through I2C3 to reduce the charging power by half or less, and how much the device charging power that needs to be reduced can be designed based on the power that the battery pack 103 can provide. For example, total power consumption of power amplifier (assumed to be 20 W) plus USB C 1 power supply up to 60 W and USB A maximum 15 W together with system power supply (negligible) are equal to 95 W, which is less than the power of the battery pack power (assumed to be 100 W). If the power amplifier 121 and USB A are not in use, the maximum charging power of the external device can reach 100 W. If the external device is fully charged as described above but is still not unplug from USB C Port 1 117, if there is no power supply from USB A in non-radio mode, no music playing in Bluetooth mode, no signal input from AUX terminal, etc., after a period of time, the main controller 111 will start timing. For example, after 10 minutes, the Auto_OFF pin of the main controller 111 will automatically pull low to trigger the power trigger control switching module 107 making switch Q32 opened and turn off the total power of the audio system to reduce the standby power consumption of the battery pack 103. If voltage of the battery pack 103 is under a threshold voltage detected by the Cell UVP module during the discharge process or after a period of time, the Cell UVP module will connect the power trigger control switching module 107 to pull low through diode D12 to turn off the switches Q31 and Q32 for protecting the battery pack 103 from over-discharge. To restart the charging, just plug in the AC power and press the CHG/DISCHG ON/OFF key for a short time.

V. When the jobsite audio device 101 is or isn't inserted with the battery pack 103 of power tool (not performing charging), the AC-DC power supply 105 is used to charge the external device coupled to the USB C port 1 117.

In case V(a), PWR switch is in OFF state and CHG/DISCHG switch in ON state. Short pressing CHG/DISCHG ON/OFF key to trigger the power trigger control switching module 107 making switch Q31 closed circuit (ON), power of the 24 Vdc is greater than that of battery pack 103, power of the 24 Vdc enters to Q31 through diode D1 and is divided into two routes, the first route enters diode D5 to activate the 5V DC-DC converter to step down voltage and supply 5V_BUS power to the USB A power unit 109 and then supply power to the main controller 111 via 3V3 LDO1 for lowering and stabilizing voltage, so that the main controller 111 can control switches Q1, Q2, Q3, and Q5 closed circuit via 3V3_PA_EN and/ADC_EN pins and supply power to the PD DRP controller 115. The PD DRP controller 115 communicates with the main controller 111 through UART2. If there is an external device plugged into the USB C port 1 117 at this time and requires power supply, the PD DRP controller 115 communicates with the external device through C1/CC2/DP/DM pins of the USB C port 1 117. The external device start to do link protocol communication, if both parties agree the protocol, the PD DRP controller enables 115 VBUS_P_CTRL pin to make switch Q15 opened, VBUS_C_CTRL pin to make switch Q16 closed, CHG_EN pin to make switches Q14 and Q9 closed, letting PSTOP pin to pull high to activate the buck/boost converter 119. The buck/boost converter 119 communicates with the main controller 111 through UART2, while the AC_SNS pin of the main controller 111 detects that there is 24 Vdc input, UART2 notifies the PD DRP controller utilizing I2C3 to control the AC_Sink pin of the buck/boost converter 119 floating, so that the switch Q13 is closed circuit and the switch Q12 is open circuit for preventing the current of the VBATT from flowing reversely through switches Q4 and Q9 via the battery terminals. The buck/boost converter 119 converses the 24 Vdc fed into the VBAT into suitable voltage and then outputs it from the VBUS Pin through the VBUS_C_MON pin of the PD DRP controller 115 to monitor the potential. After that, the PD DRP controller 115 monitors the buck/boost converter 119 through I2C3 and then the power flows through switch Q16 and VBUS_C+ to charge the external device connected to USBC Port 1 117. When the external device connected to the USB C port 1 117 is fully charged and the buck/boost converter 119 of the system is turned off. If the external device is not unplugged for 1 minute, the PD DRP controller 115 will send a sleep signal and UART2 will notify the main controller 111. After that, the main controller 111 will start timing, if there is no other power consumption, the Auto_Shutdown pin will automatically pull low after 5 minutes, so that the power trigger control switching module 107 make switch Q31 opened (OFF) and the 24 Vdc power supply will be cut off. If 24 Vdc is used to supply power to USB C Port alone, the power provided can reach up to 100 W. If USB A Port 113 is also used, the total power of USB C Port 1 117 to supply power to external devices must be reduced for design consideration. In this situation, power consumption for USB C device (maximum 60 W) plus USB A (maximum 15 W), which is 75 W and is less than 24 Vdc power supply (assume to be 100 W).

In case V(b), PWR switch is in ON state and CHG/DISCHG switch in OFF state. Short pressing CHG/DISCHG ON/OFF key to trigger the power trigger control switching module 107 making switch Q32 closed circuit (ON), same as the operation described in case I(a), 24 Vdc power is supplied to the system through diode D6, the power delivery route and related operation for the power amplifier and 3.3V digital system of the audio device is the same as described in case I(b), but the power supply mode for the external device is the same as described in case V(a). When the external device connected to the USB C port 1 117 is fully charged and the buck/boost converter 119 of the system is turned off, if the device is not unplugged after 1 minute, the PD DRP controller 115 will send a sleep signal and the UART2 will notify the main controller 111. The main controller 111 starts timing, if there is no other power consumption mode, the Auto_OFF pin will automatically pull low after 10 minutes, so that the power trigger control switching module makes switch Q32 opened (OFF) and the power supply 24 Vdc is cut off to avoid standby power consumption.

VI. Abnormal overvoltage protection (OVP) module action principle description:

By taking the aforementioned cases II and III as examples, when charging internal or external battery pack from USB C Port 117, future USB C will apply newer PD 3.1 adapters and device products with high voltage specifications, and will share the USB C port with PD 3.0/2.0 and PD 3.1 EPR. For PD 3.1 EPR, their working voltage is as high as 28V/36V/48V, which is much higher than that of PD 3.0/2.0. The components used in the current electronic products or generally, the withstand voltage of semiconductors can only support up to the range of 22V~ 30V. If the PD 3.1 AC adapter is mistakenly plugged into a device that only supports PD 3.0/2.0 to charge, the communication interface CC1/CC2 take misjudgments or the internal PD controller has a design bug, there may be a problem. It is possible to deliver potential higher than the PD 3.0/2.0 device can withstand and cause that the device be damaged at the moment of charging. Therefore, an abnormal overvoltage protection device should be placed at downstream facing port (DFP) of the USB C port 117. Refer to the circuit block diagram depicted in FIG. 1, when the VBUS_C+ terminal of the power receiving end has a pulse wave or an abnormal potential greater than 22V, the T pin of the abnormal OVP module 129 detects the abnormal potential. After the OVP pin of the abnormal OVP module 129 detects the abnormal potential, immediately use diode D16 to pull low switch Q15 (opened) and disconnect USB_C and USB_C+ of the DFP power receiving end to protect the power receiving end parts from being damaged. After the USB_C+ potential returns to the threshold value, the OVP pin of the device will return to the float state and switch Q15 will return to a closed circuit. This protection module is suitable for electronic products with USB C ports such as NB, Smartphone, TV, i-Pad, Audio, PC, TV, Monitor, HUB, Power Bank, etc.

VII. Description of the operating principle of the reverse potential difference protection module (Rev. potential diff. protect module):

By taking aforementioned cases IV and V as examples, when supplying power to an external device, under normal power supply to USB C, the current is only allowed to flow from VBUS_C to VBUS_C+, the current flows from VBUS_C+ to VBUS_C is prohibited. In status (a), if a voltage higher than VBUS_C appears on VBUS_C+ during normal operation, the reverse current may cause a voltage drop on the MOSFET Q16 switch disposed between VBUS_C+ and VBU_C, when the voltage drop is greater than 0.02V (threshold voltage) or there is a short circuit at the back end of VBUS_C, the reverse potential difference protection module 131 has reverse voltage drop, i.e., voltage of negative pin (−)>positive pin (+). When the reverse voltage drop>0.02V, RVP pin of the reverse potential difference protection module 131 uses diode D17 to immediately pull low the switch Q19 making it opened circuit to let the upstream facing port (UFP) of the power supply terminal opened, and at the same time uses diode D15 to force the PSTOP pin pulling low of the buck/boost converter 119 to stop charging immediately for preventing the current from flowing reversely, i.e. flowing from the VBUS_C+ port to the power supply terminal VBUS_C. At the same time, the RVP pin is also connected to the Sink_Abnormal pin of the main controller 111 to notify warning by showing an abnormality message on the display unit or lighting on the LED warning lights. In status (b), if the load current increases under normal power supply status, the on resistance between source and drain ($R_{DSON}$) of the MOSFET switch Q16 will increase in temperature as the current increases. The higher the temperature, the $R_{DSON}$ will increase again. If the external device will be fully charged and the charger terminal (including the battery pack), such as VBUS terminal, experiences a slight drop in the potential but enough for letting VBUS_C+>VBUS_C, to generate a reverse potential difference. That means, voltage of negative pin (−) is greater than that of positive pin (+). When the reverse voltage drop>0.02V, the RVP pin of the reverse potential difference protection module 131 will start to operate as described in status (a).

Figure 2:
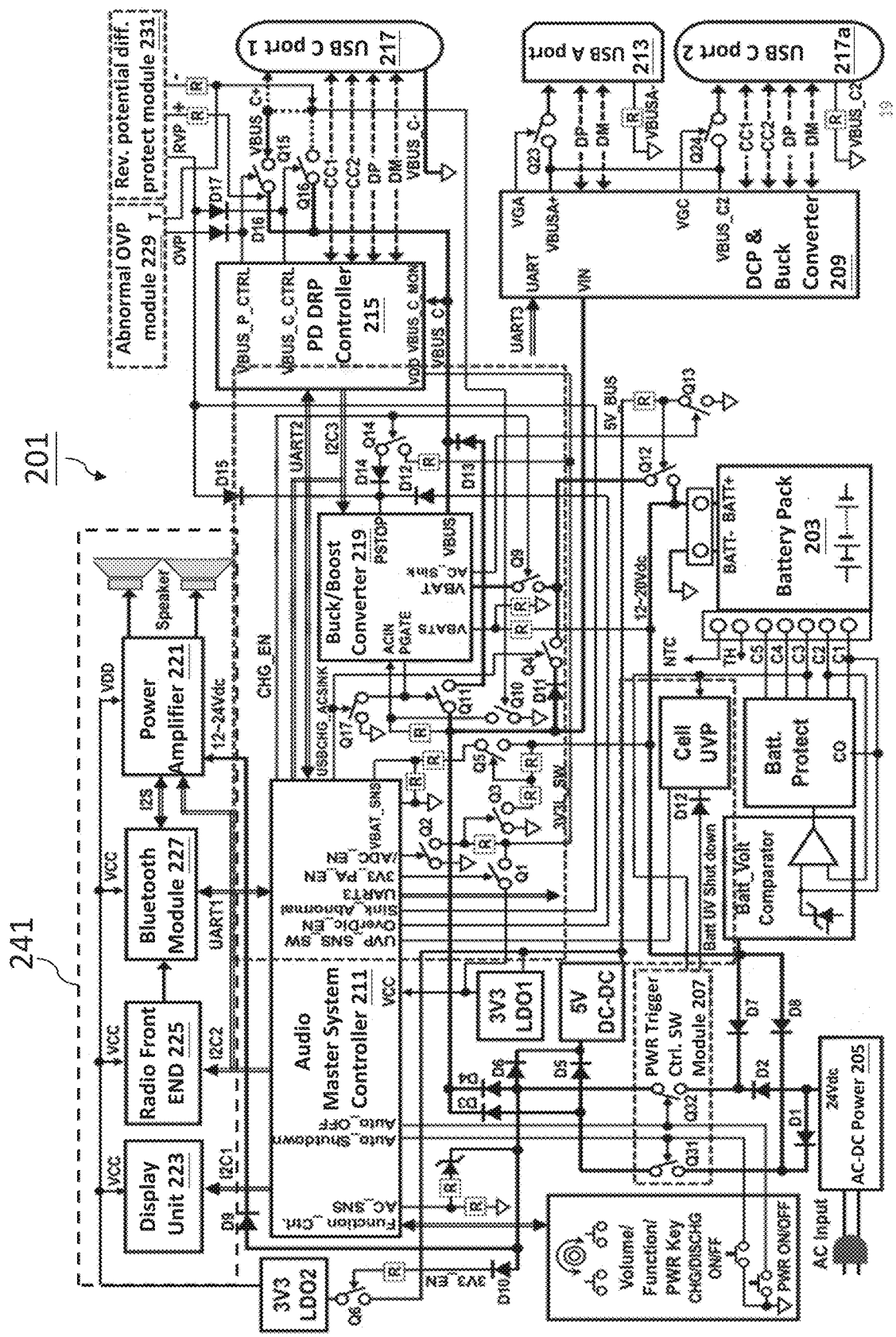
FIG. 2 shows a circuit block diagram of a jobsite audio device according to another embodiment of the present invention.

In another aspect of the present invention, according to the block diagram will be shown in FIG. 2, the relationship between the built-in transfer device (or charger/discharger converter) and the external rechargeable/dischargeable battery pack of the jobsite audio device, where the coupling between them is connected with a built-in battery pack terminal block as the interface of power transmission.

This proposed jobsite audio device contains two USB C ports, USB C port 1 and USC C port 2, and one USB A port, where the USB C port 1 can provide two-way power delivery:

A. an USB C PD 3.0/3.1 AC adapter can be provided to charge the battery pack up to 100 Wh;

B. when the AC-DC power supply is plugged in but (i) the battery pack of the power tool pack is not asserted or the battery pack is not charged, (ii) the USB A port is not supplying power, (iii) USB C port 2 is not supplying power, and (iv) the audio device is not powered, use the USB C port to provide power to external devices up to 100 W, how much power can be provided depends on the design of the built-in AC-DC power supply and output power design of the audio power amplifier of the audio device;

C. when the AC-DC power supply is plugged in but (i) the battery pack of the power tool pack is not asserted or the battery pack is not charged, (ii) USB A is not supplying power, and (iii) the audio device is not powered, use two USB C ports to supply power to external devices, where USB C port 1 can provide power up to 100 W and USB C port 2 can provide power up to 65 W;

D. when the AC-DC power supply is plugged in but (i) the battery pack of the power tool pack is not asserted or the battery pack is not charged, (ii) the audio device is not powered, use two USB C ports to supply power to external devices, where USB C port 1 can provide power up to 100 W and USB C port 2 can provide power up to 65 W; if the USB A is also used to supply power, USB C port 2 can provide power up to 45 W and USB A can provide power up to 18 W;

E. USB port A can provide a maximum power output of 18 W 5V/3.6 A.

F. only the AC-DC power supply is used to supply power to the battery pack, (i) USB C is not used, (ii) both USB C port 2 and USB A port are used to supply power to the DCP and buck converter, total power delivered by them can reach up to 65 W;

G. when only single USB C PD 3.0 AC adapter is inserted into USB C port 1, the USB C PD 3.0 AC adapter can provide a maximum power up to 100 W to charge the battery pack;

H. the inserted battery pack can supply power to USB C port 1, DCP and buck converter and USB C port 2/USB A port, how much power it can provide depends on the capacity of the battery pack, and the maximum power supplied can be 100 W.

FIG. 2 shows a circuit block diagram of a jobsite audio device 201 according to one embodiment of the present invention. The following descriptions uses the block diagram shown in FIG. 2 to describe the operating states of various charging and power supply circuits.

I. When the jobsite audio device 201 is inserted with the battery pack 203 of power tool and is plugged in the AC-DC power supply to charge the battery pack or the battery pack is in fully charge the state.

In case I(a), power switch is in OFF state and CHG/DISCHG in ON state. Short pressing the CHG/DISCHG ON/OFF key to trigger the power trigger control switching module 207, switch Q31 is ON to form closed circuit followed by providing 5V_BUS power to the DCP and buck converter 209 integrated with USB C port 2 (second USB C port) 217a and USB A port 213 and providing 3V3 LDO1 power to the main controller 211 of the audio device 201. In some embodiments of the present invention, the DCP and buck converter 209 is a buck converter having USB dedicated charging port (DCP). The operations of the main controller 211 are the same as described in case I(a) regarding to FIG. 1 and will not be repeated here. When USB C port 2 217a and USB A port 213 have equipments plugged in, equipments (or devices) communicate with DCP and buck converter 209 through CC1/CC2/DP/DM and DP/DM terminals, the USB C port 2 (second USB C port) 217a can reach a maximum of 65 W (when used alone), if the USB A port 213 is also used together, the USB C port 2 (second USB C port) 217a can only provide 45 W while USB A port 213 can reach up to 18 W. DCP and buck converter 209 uses UART3 to communicate with the main controller 211, and the amount of output power that can be delivered to the connected devices depends on the power supply status. As above conditions, total power needed including charging power of the battery pack 203 for five serial-connected cells with 20V and current limit 3 A (equal to 60 W), USB C port 1 (inactive), USB A (maximum 3.6 A=18 W) and USB C Port 2 (45 W), which has total power consumption 123 W, is less than AC-DC 24 Vdc power supply (assuming to be 150 W). When the battery pack 203 is fully charged and the charging is stopped, for example, after 5 minutes, the UART2, I2C3, UART3 and other operation pins of the main controller 211 detect no feedback signals, no usage or operations. The main controller 211 will be automatically pulled low turn by the Auto_Shutdown pin, so that switch Q31 of the power trigger control switching module 207 is opened (OFF) to turn off both the 24 Vdc and VBATT power supply.

In case I(b), power switch is in ON state and CHG/DISCHG in OFF state. Short pressing the CHG/DISCHG ON/OFF key to trigger the power trigger control switching module 207, switch Q32 is ON to form closed circuit followed by providing 5V_BUS power to the DCP and buck converter 209 integrated with USB C port 2 (second USB C port) 217a and USB A port 213 and providing 3V3 LDO1 power to the main controller 211 of the audio device. The operations of the main controller 211 are the same as described in case I(a) regarding to FIG. 1 and will not be repeated here. When USB C port 2 (second USB C port) 217a and USB A port 213 have equipments plugged in, equipments (or devices) communicate with DCP and buck converter 209 through CC1/CC2/DP/DM and DP/DM terminals, the USB C port 2 217a can reach a maximum of 65 W (when used alone), if the USB A port 213 is also used together, the USB C port 2 217a can only provide 45 W while USB A port 213 can reach up to 18 W. DCP and buck converter 209 uses UART3 to communicate with the main controller 211, and the amount of output power that can be delivered to the connected devices depends on the power supply status. As above conditions, total power needed including power amplifier 221 of the audio device (20 W), charging power of the battery pack 203 for five serial-connected cells with 20V and current limit 3 A (equal to 60 W), USB A (maximum 3.6 A=18 W) and USB C Port 2 (45 W), which has total power consumption 143 W, is less than AC-DC 24 Vdc power supply (assuming to be 150 W). If the USB C 2 (second USB C port) 217a and USB A port 213 are not provided power, the battery pack 203 can charge up to 100 W. When the battery pack 203 is fully charged, USB C port 1 (first second USB C port) 217, USB C port 2 217a and USB A port 213 are not in use, there is no music playing in Bluetooth mode and no signal input from the AUX terminal, then under these operation modes for a period of time, the main controller 211 will start timing. For example, after 10 minutes, the main controller 211 of the audio device 201 will be automatically pulled low turn by the Auto_Shutdown pin, so that switch Q31 of the power trigger control switching module 207 is opened (OFF) to turn off both the 24 Vdc and battery power supply.

According to embodiments of the present invention, the aforementioned display unit 223, radio front end 225, Bluetooth module 227 and power amplifier 221 together with the speaker coupled to the power amplifier 221 can be realized as an audio module 241, which can be powered by the AC-DC power source 205 or the battery pack 203 and controlled by the main controller 211.

According to embodiments of the present invention, the USB C 2 (second USB C port) 217a is a unidirectional PD USB C port.

II. When the jobsite audio device 201 is inserted with the battery pack 203 of power tool and is only plugged in the USB C PD AC adapter to charge the battery pack 203 or the battery pack is in fully charge the state.

In case II(a), power switch is in OFF state and CHG/DISCHG in ON state. The 24 Vdc connected to the built-in AC-DC power 205 is unplugged, utilizing an USB C PD AC adapter connected to the USB C port 1 (first USB C port) 217 to provide power. Short pressing the CHG/DISCHG ON/OFF key to trigger the power trigger control switching module 207, switch Q31 is ON to form closed circuit, the 12~20 Vdc of the battery pack VBATT enters switch Q31 through diode D8 and then flows into diode D5. After that, same operation as the 5V_BUS power supply performed that is described in case I(a) regarding to FIG. 1, and the subsequent action of the battery pack charging mode is like case II(a) regarding to FIG. 1, the only difference is that the USB A power unit 109 is replaced by a DCP and buck converter 209 integrated with USB C port 2 (second USB C port) 217a and USB A port 213. When both USB C port 2 (second USB C port) 217a and USB A port 213 have devices plugged in, devices communicate with DCP and buck converter 209 through CC1/CC2/DP/DM and DP/DM terminals. USB C port 2 (second USB C port) 217a can reach a maximum of 65 W (when used alone), if USB A port 213 is used together, USB C port 2 (second USB C port) 217a can only provide 45 W, while USB A port 213 can provide up to 18 W. DCP and buck converter 209 uses UART3 to communicate with the main controller 211 of the audio device, and the amount of output power that can be delivered to the connected devices depends on the power supply status. As above conditions, total power needed including charging power of the battery pack 203 for five serial-connected cells with 20V and current limit 5 A (equal to 100 W), which has total power consumption less than or equal to the power supplied by the USB C PD AC adapter (assuming to be 100 W). In this charging state, the power supplied by USB A port 213 and USB C port 2 (second USB C port) 217a is responsible for the battery pack (maximum 65 W), which is not included in the total charging power of the USB C PD AC adapter, and the charging power of the USB C PD AC adapter to the rechargeable battery pack can reach up to 100 W. When the battery pack is fully charged and the charging is stopped, for example, after 5 minutes, the UART2, I2C3, UART3 and other operation pins of the main controller 211 detect no feedback signals, no usage, or operations. The main controller 211 will be automatically pulled low by the Auto_Shutdown pin, so that switch Q31 of the power trigger control switching module 207 is opened (OFF) to turn off the 12~20V battery power source.

In case II(b), power switch is in ON state and CHG/DISCHG in OFF state. Short pressing the CHG/DISCHG ON/OFF key to trigger the power trigger control switching module 207, switch Q32 is ON to form closed circuit, 12~20 Vdc of the battery pack VBATT enters to Q32 through D7 and then branched into three power routes to provide power. The subsequent actions (operations) are similar as the 5V_BUS power supply performed that is described in case II(a) regarding to FIG. 1 and the subsequent action of the battery pack charging mode is like case II(a) regarding to FIG. 1, the only difference is that the USB A power unit 109 is replaced by a DCP and buck converter 209 integrated with USB C port 2 (second USB C port) 217a and USB A port 213. When both USB C port 2 (second USB C port) 217a and USB A port 213 have devices plugged in, devices communicate with DCP and buck converter 209 through CC1/CC2/DP/DM and DP/DM terminals. USB C port 2 (second USB C port) 217a can reach a maximum of 65 W (when used alone), if USB A port 213 is used together, USB C port 2 (second USB C port) 217a can only provide 45 W, while USB A port 213 can provide up to 18 W. DCP and buck converter 209 uses UART3 to communicate with the main controller 211 of the audio device, and the amount of output power that can be delivered to the connected devices depends on the power supply status. As above conditions, total power needed including charging power of the battery pack for five serial-connected cells with 20V and current limit 5 A (equal to 100 W), which has total power consumption less than or equal to the power supplied by the USB C PD AC adapter (assuming to be 100 W). In this state, the power consumption of USB A port 213, USB C port 2 (second USB C port) 217a, and power amplifier 221 is supplied by the battery pack 203 and is not included in the total power consumption of the charging circuit. In this charging state, the battery pack 203 can charge up to 100 W. Under the condition that the battery pack 203 is fully charged as described in the above item, for example, after 10 minutes, the UART2, I2C3, UART3 and other operation pins of the main controller 211 detect no feedback signals, no usage or operations. The main controller 211 will be automatically pulled low by the Auto_shutdown pin, so that switch Q32 of the power trigger control switching module 207 is opened to turn off the battery power source.

III. When the jobsite audio device 201 is inserted with the battery pack 203 of power tool and is also plugged in the AC-DC power source 205 and the USB C PD AC adapter to charge the battery pack 203 or the battery pack is in fully charge the state.

In case III(a), power switch is in OFF state and CHG/DISCHG in ON state. Short pressing the CHG/DISCHG ON/OFF key to trigger the power trigger control switching module 207, switch Q31 is ON to form closed circuit, the 24 Vdc enters to diode D5, the 5V_BUS power supply operation mode and the subsequent battery pack charging mode are described in case III(a) regarding to FIG. 1, the only difference is that the USB A power unit 109 is replaced by a DCP and buck converter 209 integrated with USB C port 2 (second USB C port) 217a and USB A port 213. How much charging power should be allocated here should be appropriately designed and changed according to the power provided by the USB C PD AC adapter and the battery pack 203. The total power of the USB C power supply includes charging power of the battery pack 203 for five serial-connected cells with 20V and current 5 A (equal to 100 W), which is less than the power supplied by the USB C AC adapter (assuming to be 100 W), in this state the power consumption of USB A port 213 and USB C port 2 (second USB C port) 217a is supplied by the battery pack 203 and not included in the total power supply of the charging circuit, the charging power of the battery pack 203 is up to 100 W. Under the condition that the battery pack 203 is fully charged as described in the above item, for example, after 10 minutes, the UART2, I2C3, UART3 and other operation pins of the main controller 211 detect no feedback signals, no usage, or operations. The main controller 211 will be automatically pulled low by the Auto_shutdown pin, so that switch Q32 of the power trigger control switching module 207 is opened to turn off the battery power source.

IV. When the jobsite audio device 201 is only inserted with the battery pack 203 of power tool and an external device is plugged in to request power, but not plugged in AC-DC power source 205 and the USB C PD AC adapter.

In case IV(a), power switch is in OFF state and CHG/DISCHG in ON state. Short pressing the CHG/DISCHG ON/OFF key to trigger the power trigger control switching module 207, switch Q31 is ON to form closed circuit, the 12~20 Vdc current of VBATT flows into Q31 through D8 and then divides into two power supply routes. The subsequent 5V_BUS operation mode and USB C Port 1 (first USB C port) 217 power supply mode are the same as those described in case IV(a) regarding to FIG. 1. When there is no device connected in USB C port 2 217a and USB A port 213 for requesting power supply, USB C port 1 (first USB C port) 217 can provide a maximum power of 100 W. At this time, if an external device is plugged into USB A port 213 and requires power supply, the DCP and buck converter 209 uses DP/DM pins to communicate with the external device, after confirming the agreement, start to supply power to the external device. If there is a device plugged into USB C port 2 (second USB C port) 217a, the device communicates with DCP and buck converter 209 through CC1/CC2/DP/DM. USB C Port 2 can reach a maximum of 65 W (when used alone). If USB A port is used together, USB C port 2 can only provide 45 W, while USB A port can provide up to 18 W. DCP and buck converter 209 uses UART3 to communicate with the main controller 211 to adjust output power to the device, how much power need to be adjust depends on the current battery supply status. By default, if USB C Port 1 213 is provided power, USB C Port 2 (second USB C port) 217a will not provide power. For example, USB C port 1

(first USB C port) 217 can charge the device up to 60 W, USB A port 213 can charge the device up to 18 W, system power supply is negligible, and USB C port 2 (second USB C port) 217a does not provide power when the battery pack 203 is powered. Therefore, total power consumption is 78 W, which is less than battery pack power (assuming to be 100 W). If the devices connected to USB A port 213, USB C port 1 (first USB C port) 217 and USB C port 2 (second USB C port) 217a are fully charged and unplugged (without other power consumption), for example, after 5 minutes, the main controller's Auto_Shutdown pin will automatically pull low to make switch Q31 of the power trigger control switching module 217 opened circuit to cut off the power supply VBATT, so that the automatic trigger control switch can completely cut off the current of the battery pack to prevent standby loss. Similarly, when the device connected to USB C port 1 (first USB C port) is fully charged and the buck/boost converter 219 of the system is turned off, for example, if the device has not been unplugged for 1 minute, the PD DRP controller 215 will send a sleep signal and UART2 will notify the main controller 211. After that, the main controller 211 will start timing. If there is no other power consumption, the Auto_Shutdown pin of the main controller 211 will automatically pull low after 5 minutes, so that the switch Q31 of the power trigger control switching module 207 will be opened and the power supply VBATT will be cut off. If USB C port 1 (first USB C port) 217 is used alone to supply power to external device, it can provide power up to 100 W depending on the capacity of the battery pack. If USB A port 213 and USB C Port 2 (second USB C port) 217a are also used together, the total power of USB C port 1 (first USB C port) 217 to supply power to external devices must be reduced. If the voltage of the battery pack 203 is detected to be too low by the Cell UVP module during discharge or after being placed for a period of time, the Cell UVP module will connect power trigger control switching module 207 to pull low switches Q31 and Q32 making them OFF through diode D12 for protecting the battery pack 203 from over-discharge. To restart the charging, just plug in the AC power and press the CHG/DISCHG ON/OFF key for a short time to charge the battery pack 203.

In case IV(b), power switch is in ON state and CHG/DISCHG in OFF state. Short pressing the CHG/DISCHG ON/OFF key to trigger the power trigger control switching module 207, switch Q32 is ON to form closed circuit, power of the battery pack (12~20 Vdc) flows into Q32 through D78 and then divides into four power supply routes, the 5V_BUS power supply mode is consistent with the action described in case IV(b) regarding to FIG. 1. After that, if the volume is turned up to the set power or maximum when playing music, the main controller 211 will immediately controls the buck/boost converter 219 through I2C3 to reduce the charging power by half or less, and the amount of device charging power needs to be reduced according to the power that the battery pack 203 can provide. For example, total power consumption of power amplifier (assumed to be 20 W) 221 plus USB C 1 power supply up to 60 W and USB A maximum 18 W together with system power supply (negligible) are equal to 98 W, which is less than the power of the battery pack power (assumed to be 100 W). If the power amplifier 221, USB A port 213 and USB C port 2 (second USB C port) 217a are not in use, the maximum charging power of the external device can reach 100 W. If the external device is fully charged as described above but is still not unplug from USB C port 1 217, USB C port 2 (second USB C port) 217a and USB A port 213, if there is no power supply from USB A in non-radio mode, no music playing in Bluetooth mode, no signal input from AUX terminal, etc., after a period of time, the main controller 211 will start timing. For example, after 10 minutes, the Auto_OFF pin of the main controller 211 will automatically pull low to trigger the power trigger control switching module 207 making switch Q32 opened and turn off the total power of the audio system to reduce the standby power consumption of the battery pack 203. If voltage of the battery pack 203 is under a threshold voltage detected by the Cell UVP module during the discharge process or after a period of time, the Cell UVP module will connect the power trigger control switching module 207 through diode D12 to pull low switches Q31 and Q32 making them OFF for protecting the battery pack 203 from over-discharge. To restart the charging, just plug in the AC power and press the CHG/DISCHG ON/OFF key for a short time.

V. When the jobsite audio device 201 is or isn't inserted with the battery pack 203 of power tool (not performing charging), the AC-DC power supply 205 is used to charge the external device coupled to the USB C port.

In case V(a), PWR switch is in OFF state and CHG/DISCHG switch in ON state. Short pressing CHG/DISCHG ON/OFF key to trigger the power trigger control switching module 207 making switch Q31 closed circuit (ON), power of the 24 Vdc is greater than that of battery pack 203, power of the 24 Vdc enters to Q31 through diode D1 and is divided into two routes, the 5V_BUS power supply mode is consistent with the action described in case V(a) regarding to FIG. 1. When the external device connected to the USB C port 1 (first USB C port) 217 is fully charged and the buck/boost converter 219 of the system is turned off. If the external device is not unplugged for 1 minute, the PD DRP controller 215 will send a sleep signal and UART2 will notify the main controller 211. After that, the main controller 211 will start timing, if there is no other power consumption, the Auto_Shutdown pin will automatically pull low after 5 minutes, so that the power trigger control switching module 207 make switch Q31 opened (OFF) and the 24 Vdc power supply will be cut off. If 24 Vdc is used to supply power to USB C Port alone, the power provided can reach up to 100 W. If USB A port 213 and USB C port 2 217a are also used, the total power of USB C Port 1 (first USB C port) 217 to supply power to external devices must be reduced for design consideration. In this situation, power consumption for device connected to USB C (first USB C port) 1 (maximum 60 W) plus device connected to USB A port (maximum 18 W) and device connected to USB C port 2 (45 W), which is 123 W and is less than 24 Vdc power supply (assume to be 150 W).

In case V(b), PWR switch is in ON state and CHG/DISCHG switch in OFF state. Short pressing CHG/DISCHG ON/OFF key to trigger the power trigger control switching module 207 making switch Q32 closed circuit (ON), same as the operation described in case V(b) regarding to FIG. 1, the 24 Vdc supplies power to the system through diode D6, and the operations of radio power amplifier 211 and 3.3V digital system power supply are the same as described in case V(b) regarding to FIG. 1. When the external device connected to the USB C port 1 (first USB C port) 217 is fully charged and the buck/boost converter 219 of the system is turned off, if the device is not unplugged after 1 minute, the PD DRP controller 215 will send a sleep signal and the UART2 will notify the main controller 211. The main controller 211 starts timing, if there is no other power consumption mode, the Auto_OFF pin will automatically pull low after 10 minutes, so that the power trigger control switching module 207 makes switch Q32 opened (OFF) and the power supply 24 Vdc is cut off to avoid standby power consumption. When the battery pack 203 is not inserted, if 24 Vdc is used to supply power to USB C Port 1 (first USB C port) 217 alone, the maximum power can be 100 W. If USB A port 213 and USB C Port 2 217a are also used, the total power of USB C port 1 (first USB C port) 217 to power external devices must be reduced. Total power consumption includes the USB C port 1 (up to 60 W), USB port A (up to 18 W), USB C port 2 (45 W), power amplifier (assumed to be 20 W) and system power supply (negligible), which is 143 W and is less than 24 Vdc power supply (assumed to be 150 W) can provide. When USB C port 2 (second USB C port) is not in use, USB C port 1 (first USB C port) can provide a maximum power of 100 W. If the battery pack 203 is inserted and used simultaneously with 24 Vdc to power USB C Port 1 (first USB C port) 217, when USB A Port 213 and USB C Port 2 (second USB C port) 217a are also used, total power consumption includes USB C Port 1 (max 100 W), USB A port (max 18 W), USB C port 2 (45 W), power amplifier (assumed to be 20 W) and system power supply (negligible), which is 183 W and is less than 24 Vdc power supply (assumed to be 150 W) together with battery pack (assumed to be 100 W) can supply. When the USB C Port 1 (first USB C port) 217 is fully charged and the buck/boost converter 219 of the system is turned off, for example, if it has not been unplugged after 1 minute, the PD DRP controller 215 will send a sleep signal, which will be notified by the main controller 211 through UART2. The main controller 211 starts timing and if there is no other power consumption mode, after 5 minutes, the Auto_Shutdown pin of the main controller 211 will automatically pull low, so that the switch Q31 of the power trigger control switching module 207 will be opened and the 24 Vdc power supply will be cut off.

VI. Description of abnormal overvoltage protection (OVP) module action principle: same as described in aforementioned paragraph regarding to FIG. 1.

VII. Description of the operation principle of the reverse potential difference protection module: same as described in aforementioned paragraph regarding to FIG. 1.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A jobsite audio device with multi-source power and multi-port USB interface, said jobsite audio device comprising:
   an AC-DC power source;
   a battery pack;
   a multi-port USB interface, including at least one bidirectional power delivery USB C port;
   a charging circuit coupled to said AC-DC power source, said battery pack and said multi-port USB interface to provide power delivery paths;
   an audio module powered by said AC-DC power source or said battery pack to generate audio signals;
   a main controller coupled to said charging circuit and said audio module;
   wherein said main controller monitors power consumption of said audio module and charging process of said charging circuit to automatically adjust charging power; and wherein said charging circuit includes a buck/boost converter electrical coupled to a power delivery dual role port controller (PD DRP controller), wherein said buck/boost converter is coupled to said main controller and said battery pack, and wherein said PD DRP controller is coupled to a bidirectional power delivery USB C port of said multi-port USB interface.

2. The jobsite audio device of claim 1, wherein said multi-port USB interface further includes a USB A port which is powered by an USB A power unit.

3. The jobsite audio device of claim 2, wherein if said multi-port USB interface has no device coupled, wherein said AC-DC power source powers said main controller and said PD DRP controller to charge said battery pack by activating said buck/boost converter.

4. The jobsite audio device of claim 2, wherein if said bidirectional power delivery USB C port is coupled an USB C AC adapter and said AC-DC power source is removed, wherein said PD DRP controller charges said battery pack by activating said buck/boost converter.

5. The jobsite audio device of claim 2, wherein if said bidirectional power delivery USB C port is coupled an USB C AC adapter and said AC-DC power source is also coupled, wherein said AC-DC power source powers said main controller and said PD DRP controller, and blocks power from said DC power to enter into said bidirectional power delivery USB C port.

6. The jobsite audio device of claim 2, wherein if said jobsite audio device is only coupled with said battery pack, and wherein said bidirectional power delivery USB C port is coupled with an external device to request power, wherein said battery provides DC power to power said main controller and said PD DRP controller for charging said external device.

7. The jobsite audio device of claim 2, wherein if said AC-DC power source is used to charge an external device coupled to said bidirectional power delivery USB C port, wherein said AC-DC power source powers said main controller and said PD DRP controller, wherein said buck/boost converter converts said DC power of said AC-DC power source and then delivers to said external device.

8. The jobsite audio device of claim 2, wherein said bidirectional power delivery USB C port further includes an abnormal overvoltage protection device disposed at downstream facing port of said bidirectional power delivery USB C port to detect abnormal potential.

9. The jobsite audio device of claim 2, wherein said bidirectional power delivery USB C port further includes a reverse potential difference potential module disposed at downstream facing port of said bidirectional power delivery USB C port to protect current from flowing reversely.

10. A jobsite audio device with multi-source power and multi-port USB interface, said jobsite audio device comprising:
   an AC-DC power source;
   a battery pack;
   a multi-port USB interface, including one bidirectional power delivery USB C port, one unidirectional power delivery USB C port and one USB A port;
   a charging circuit coupled to said AC-DC power source, said battery pack and said multi-port USB interface to provide power delivery paths;
   an audio module powered by said AC-DC power source or said battery pack to generate audio signals;
   a main controller coupled to said charging circuit and said audio module;

wherein said main controller monitors power consumption of said audio module and charging process of said charging circuit to automatically adjust charging power; and wherein said charging circuit includes a buck/boost converter electrical coupled to a power delivery dual role port controller (PD DRP controller), said buck/boost converter being coupled to said main controller and said battery pack, and said PD DRP controller being coupled to bidirectional power delivery USB C port of said multi-port USB interface.

11. The jobsite audio device of claim 10, wherein said unidirectional power delivery USB C port and one USB A port are integrated with a DCP and buck converter.

12. The jobsite audio device of claim 11, wherein if said multi-port USB interface has no device coupled, wherein said AC-DC power source powers said main controller and said PD DRP controller to charge said battery pack by activating said buck/boost converter.

13. The jobsite audio device of claim 11, wherein if said bidirectional power delivery USB C port coupled an USB C AC adapter and said AC-DC power source is removed, wherein said PD DRP controller charge said battery pack by activating said buck/boost converter.

14. The jobsite audio device of claim 11, wherein if said bidirectional power delivery USB C port is coupled an USB C AC adapter and said AC-DC power source is also coupled, wherein said AC-DC power source powers said main controller and said PD DRP controller, and blocks power from said DC power to enter into said bidirectional power delivery USB C port.

15. The jobsite audio device of claim 11, wherein if said jobsite audio device is only coupled with said battery pack, and wherein said bidirectional power delivery USB C port is coupled with an external device to request power, wherein said battery provides DC power to power said main controller and said PD DRP controller for charging said external device.

16. The jobsite audio device of claim 11, wherein if said AC-DC power source is used to charge an external device coupled to said bidirectional power delivery USB C port, wherein said AC-DC power source powers said main controller and said PD DRP controller, wherein said buck/boost converter converts said DC power of said AC-DC power source and then delivers to said external device.

17. The jobsite audio device of claim 11, wherein said bidirectional power delivery USB C port further includes an abnormal overvoltage protection device disposed at downstream facing port of said bidirectional power delivery USB C port to detect abnormal potential.

18. The jobsite audio device of claim 11, wherein said bidirectional power delivery USB C port further includes a reverse potential difference potential module disposed at downstream facing port of said bidirectional power delivery USB C port to protect current from flowing reversely.

* * * * *